(12) United States Patent
Song et al.

(10) Patent No.: US 6,611,120 B2
(45) Date of Patent: Aug. 26, 2003

(54) ROBOT CLEANING SYSTEM USING MOBILE COMMUNICATION NETWORK

(75) Inventors: Jeong-gon Song, Gwangju (KR); Jang-youn Ko, Gwangju (KR); Sang-yong Lee, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 10/100,665

(22) Filed: Mar. 18, 2002

(65) Prior Publication Data

US 2002/0153855 A1 Oct. 24, 2002

(30) Foreign Application Priority Data

Apr. 18, 2001 (KR) ........................................ 2001-20857

(51) Int. Cl.[7] ................................................ B25J 5/00
(52) U.S. Cl. .................. 318/568.12; 318/581; 318/587
(58) Field of Search ........................... 318/568.12, 587, 318/581; 342/357.1; 701/207

(56) References Cited

U.S. PATENT DOCUMENTS

| 5,709,007 | A | 1/1998 | Chiang |
| 5,959,423 | A | 9/1999 | Nakanishi et al. |
| 5,995,884 | A | 11/1999 | Allen et al. |
| 6,252,544 | B1 * | 6/2001 | Hoffberg ................ 342/357.1 |
| 6,388,218 | B1 * | 5/2002 | Ando et al. .................. 200/512 |
| 6,429,812 | B1 * | 8/2002 | Hoffberg ................ 342/357.1 |

FOREIGN PATENT DOCUMENTS

| EP | 1091273 | 4/2001 |
| GB | 2369454 | 5/2002 |
| JP | 5091556 | 4/1993 |
| JP | 1116057 | 11/1999 |
| JP | 0342496 | 12/2000 |
| JP | 0342498 | 12/2000 |
| WO | 0137060 | 5/2001 |

* cited by examiner

*Primary Examiner*—Karen Masih
(74) *Attorney, Agent, or Firm*—Ladas & Parry

(57) ABSTRACT

A robot cleaning system using a mobile communication network capable of controlling a cleaning robot from a long distance, the robot cleaning system transmitting an image data after converting the image data photographed at self-contained cameras by means of a mobile communication signal. The robot cleaning system has: a cleaning robot for cleaning by moving freely in a cleaning space in accordance with control data transmitted in the mobile communication signal; a mobile communication relaying apparatus for receiving the mobile communication signals related to the image data transmitted from the cleaning robot and for control of the cleaning robot; a mobile communication terminal for transmitting a command for cleaning to the cleaning robot through the mobile communication relaying apparatus; and an image process server for analyzing the image data transmitted through the mobile communication relaying apparatus, creating control data according to the analyzed result, and transmitting the control data to the mobile communication relaying apparatus. A user can control the cleaning robot from a long distance by using the mobile communication network. Consequently, the user can use the cleaning robot more conveniently. Moreover, an image process board does not have to be installed in the cleaning robot, since the image is processed outside of the cleaning robot. Accordingly, the cleaning robot can be manufactured as more compact and the production cost will be reduced.

6 Claims, 4 Drawing Sheets

ROBOT CLEANING SYSTEM USING MOBILE COMMUNICATION NETWORK

BACKGROUND OF THE INVENTION

1. Field of the Invention

The present invention relates generally to a robot cleaning system, and more particularly, to a robot cleaning system capable of remotely controlling a cleaning robot by using a mobile communication network.

2. Description of the Related Art

When someone cleans a floor using a vacuum cleaner, a great amount of work is required, since the person has to move the vacuum cleaner by him/herself.

Accordingly, a cleaning robot capable of cleaning by moving freely as long as a command for cleaning is ordered has been developed. In addition, a mobile robot having more functions for preventing a disaster such as a theft has been continuously studied.

FIG. 1 is a block diagram of a conventional cleaning robot.

Referring to FIG. 1, the cleaning robot has a driving unit 40 for moving a robot body, an obstacle detection unit 30 for detecting an obstacle on a path along which the cleaning robot moves, a self-position recognition unit 20 for recognizing the current position of the cleaning robot, a vacuum cleaning unit 50 for cleaning a floor, a power supply unit 70 for storing and charging power needed for each of the units, and a controller 60 for controlling each of the units. Moreover, the cleaning robot has a remote control receiving unit 10 for remotely controlling the start/stop of an operation of the cleaning robot. The self-position recognition unit 20 and the obstacle detection unit 30 respectively have image process boards 22, 32 and cameras 21, 31 for recognizing the self-position and detecting the obstacle.

The cleaning robot having the above construction initializes at the controller 60 when the cleaning operation is ordered through the remote control receiving unit 10, and photographs the self-position by operating the camera 21 of the self-position recognition unit 20. Then, the cleaning robot transmits a photographed image data to the image process board 22 and allows the image data to be processed. The controller 60 analyses the current position of the cleaning robot by analyzing the image data transmitted from the image process board 22. After that, the controller 60 moves the robot body by transmitting a control signal to motor driving units 41a, 41b of motors 42a, 42b at right and left wheels 43b, 43a, respectively.

At this time, the controller 60 controls the driving unit 40 to avoid any obstacles by operating the camera 31 of the obstacle detection unit 30 and receiving the image data encoded in the image process board 32. When the cleaning robot moves to a desirable place to be cleaned, the controller 60 outputs the control signal to the vacuum cleaning unit 50 and to the driving unit 40 to rotate and move the robot body so as to perform cleaning. The cleaning robot then performs the cleaning operation along a predetermined path.

The cleaning robot operated as describe above can avoid obstacles placed in front of the cleaning robot by recognizing the obstacles in a predetermined interval during its moving steps in the process of cleaning. Also, the cleaning robot can move to desired positions precisely by performing the self-position recognition operation at predetermined intervals.

Moreover, the cleaning robot uses a CCD (Charge Coupled Device) for recognizing its self-position and for detecting obstacles in the driving path. Yet, the size of the photographed image data is very large, thus the cleaning robot usually requires an image data processor for processing the image data separately from the controller 60.

However, for the conventional cleaning robot, difficulty arises in the manufacture of a compact cleaning robot since each of the image process boards 22, 23 having the image data processor are installed inside of the cleaning robot body.

In addition, a user must command the cleaning robot to clean within the area of the place being cleaned, since the conventional cleaning robot can be controlled only in a short distance. If the user wants to command the cleaning robot outside of the place, then there is no way to command the cleaning robot.

SUMMARY OF THE INVENTION

An object of the present invention is to provide a robot cleaning system that remotely controls a cleaning operation at long distances through a mobile communication terminal and controls a cleaning operation from off-site by processing the image data photographed in the cleaning robot through a mobile communication network.

The above object is accomplished by providing a robot cleaning system comprising: a cleaning robot for cleaning by moving freely in a cleaning place or area by control data transmitted in the mobile communication signal; a mobile communication relaying apparatus for receiving the mobile communication signal transmitted from the cleaning robot and another mobile communication signal to control the cleaning robot, and relaying the mobile communication signals to a corresponding remote apparatus; and a mobile communication terminal for transmitting command signals, for performing operations, to the cleaning robot through the mobile communication relaying apparatus.

The cleaning robot comprises: a driving unit for moving a robot body; a self-position recognition unit having a camera and a sensor for recognizing a current position of the robot body; an obstacle detection unit having a camera and a sensor for detecting obstacles adjacent the robot body; a vacuum cleaning unit for collecting dust on a floor; a mobile communication module for transmitting the mobile communication signal with the mobile communication relaying apparatus; and a controller for controlling each of the units to move and clean the cleaning area corresponding to the control data transmitted from the mobile communication module.

The controller transmits the operation completion data to the mobile communication terminal when an operation is completed in accordance with the transmitted control data.

The controller transmits an image photographed through the camera of the self-position recognition unit and the camera of the obstacle detection unit to the mobile communication relaying apparatus.

The robot cleaning system further comprises an image process server for analyzing the image data transmitted through the mobile communication relaying apparatus, and for transmitting the control data according to the analyzed result to the cleaning robot through the mobile communication relaying apparatus.

The image process server comprises: an interface for interfacing a data with the mobile communication relaying apparatus; an image process unit for processing the image data transmitted through the interface; and a controller for analyzing the image data processed at the image process unit, for creating the control data according to the analyzed result, and for outputting the control data to the interface.

Here, the interface of the image process server can transmit the image data by Internet from the mobile communication relaying apparatus through a mobile communication relay base, or directly receive an RF signal from the mobile communication relaying apparatus.

BRIEF DESCRIPTION OF THE DRAWINGS

The object and the feature of the present invention will be more apparent by describing the preferred embodiment of the present invention by referring to the appended drawings, in which.

DETAILED DESCRIPTION OF THE PREFERRED EMBODIMENT

Hereinbelow, the preferred embodiment of the present invention will be described in great detail by referring to the appended drawings.

Figure 1:
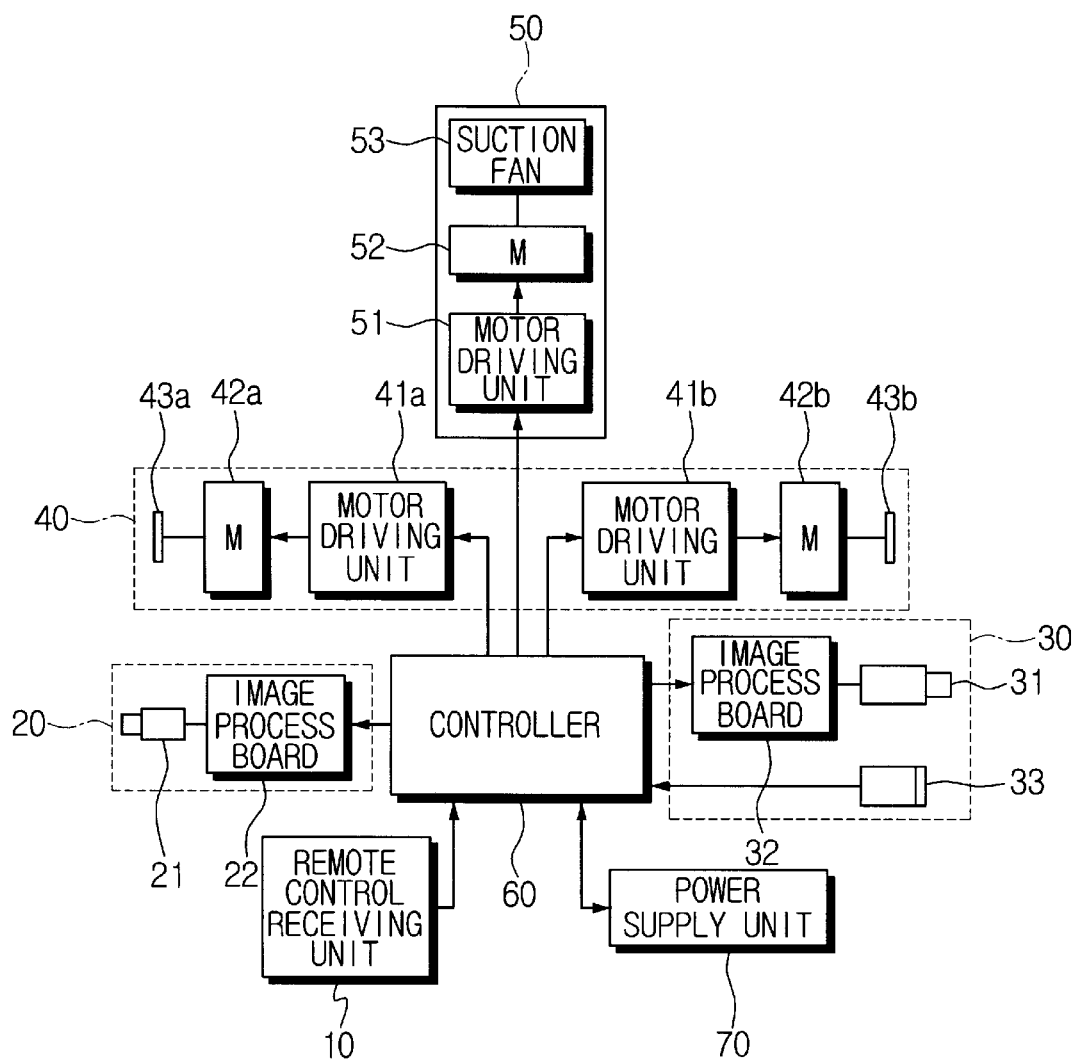
FIG. 1 is a schematic block diagram showing a conventional cleaning robot.
Figure 2:
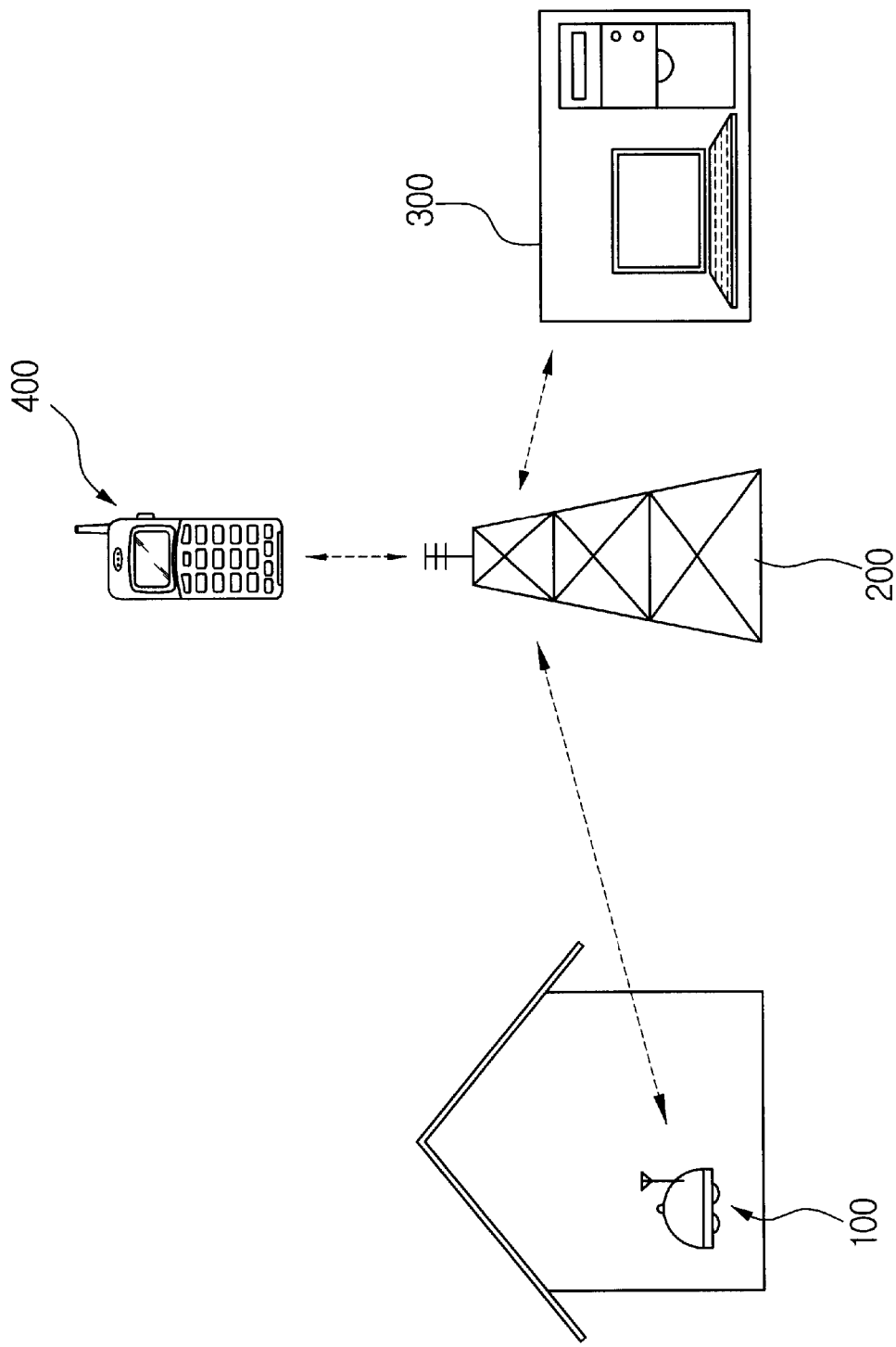
FIG. 2 is a view schematically showing a robot cleaning system using a mobile communication network according to the present invention.

Referring to FIG. 2, the robot cleaning system, according to the present invention, comprises a cleaning robot 100, a mobile communication relaying apparatus 200, a mobile communication terminal 400, and an image process server 300.

The cleaning robot 100 creates image data from an installed camera and transmits the image data to the mobile communication relaying apparatus 200 as a first mobile communication signal. The cleaning robot 100 also receives a second mobile communication signal including a control data from the mobile communication relaying apparatus 200. Moreover, the cleaning robot 100 moves the robot body and performs a cleaning operation in accordance with the control data received in the second mobile communication signal.

The mobile communication relaying apparatus 200 receives the mobile communication signals and relays the signals to a corresponding apparatus. The mobile communication signals are respectively related to the image data transmitted from the cleaning robot 100 and also related to the control of the cleaning robot transmitted from the mobile communication terminal 400 or the image process server 300.

The mobile communication terminal 400 transmits a command for working to the cleaning robot 100 through the mobile communication relaying apparatus 200.

The image process server 300 analyzes the image data transmitted through the mobile communication relaying apparatus 200, creates the control data according to the analyzed result, and transmits the control data to the mobile communication relaying apparatus 200.

Figure 3:
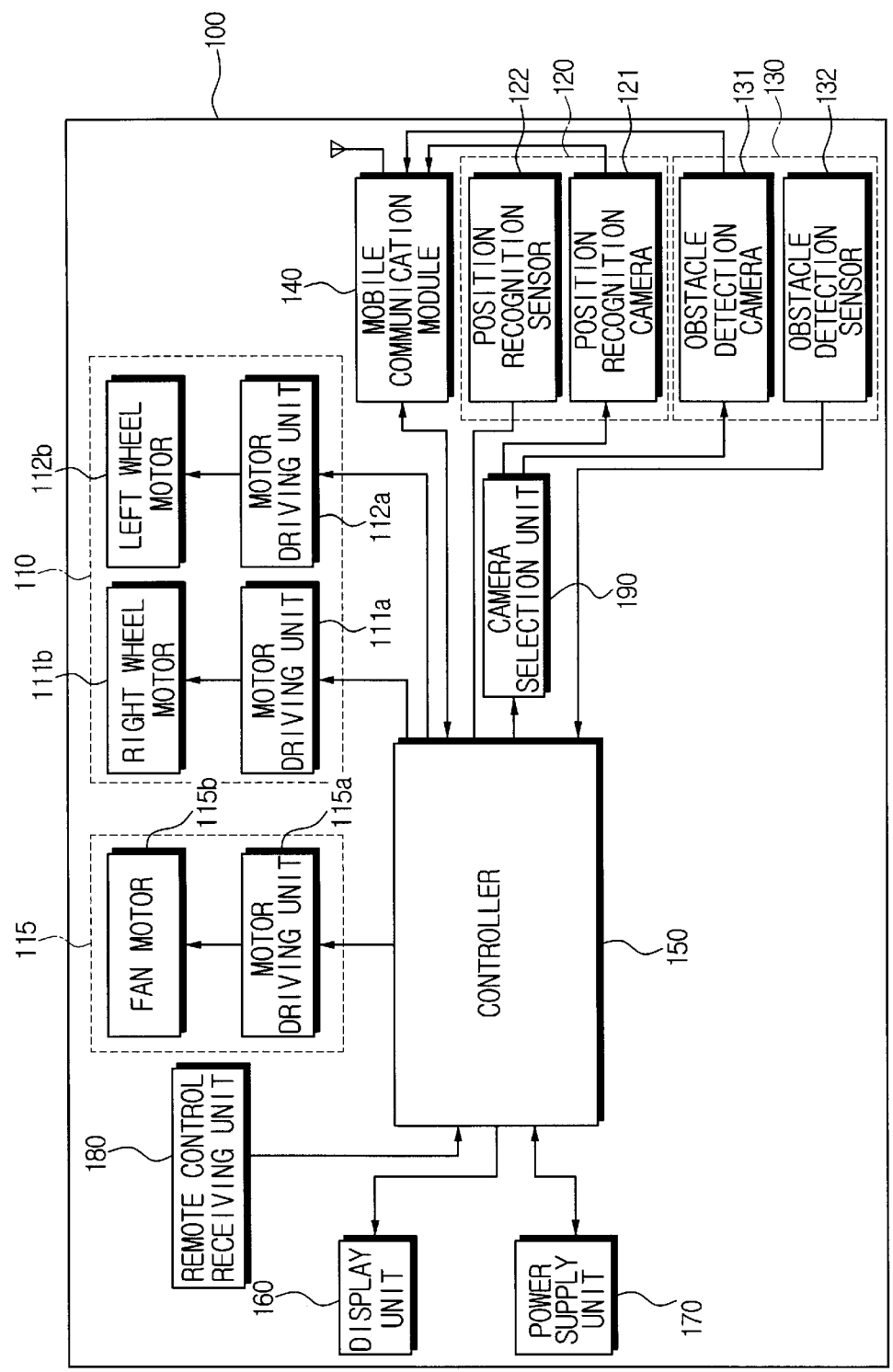
FIG. 3 is a schematic block diagram showing the cleaning robot of FIG. 2.

FIG. 3 is a schematic block diagram showing the cleaning robot according to the present invention.

Referring to FIG. 3, the cleaning robot 100 has: a driving unit 110 delineated by a dashed line, for moving the robot body; a self-position recognition unit 120 having a camera 121 and a sensor 122 for recognizing current position of the cleaning robot; an obstacle detection unit 130 having a camera 131 and a sensor 132 for detecting any obstacles along its moving path; a vacuum cleaning unit 115 for collecting dust on a floor; a mobile communication module 140 for converting and transmitting, as a mobile communication signal, the image data transmitted from the self-position recognition unit 120 and the obstacle detection unit 130 to the mobile communication signal, and for converting and outputting the transmitted mobile communication signal into the control data; and a controller 150 for controlling each of the units 110, 115, 120, 130 and 140 in order to move and clean in accordance with the control data transmitted from the mobile communication module 140.

A display unit 160 can display any abnormality of the cleaning robot 100 on the display of the image process unit 320, located outside the environment, such as a floor area, to be cleaned. The controller 150 of the cleaning robot 100 responds according to the control of any specified unit that requires performance of an operation by creating operation completion data and transmitting the data to the mobile communication module 140 when the required operation is completed. Moreover, the cleaning robot 100 has a remote control receiving unit 180, disposed to allow the control unit to respond to signals for driving, moving, cleaning, and stopping the cleaning robot. A user transmits such signals by using a remote controller at short distances; and various sensors (not shown) for protecting the robot body from being damaged, damage being caused by collision and falling, for detecting any obstacles and for recognizing the robot self-position. In addition, the cleaning robot 100 further comprises a power supply unit 170 for supplying power to each of the units and for charging the power from an external source of power (not shown).

The driving unit 110 further comprises motors 111$b$, 112$b$ driven by the operation of motor driving units 111$a$, 112$a$ to move right and left wheels, respectively. The vacuum cleaning unit 115 also has a fan motor 115$b$ having a motor driving unit 115$a$ to drive a suction fan (not shown) so as to drawn into the dust on the floor to be cleaned into the cleaning apparatus (not shown).

Moreover, the camera 121 installed in the self-position recognition unit 120 is disposed and oriented towards the ceiling, and the camera 131 installed in the obstacle detection unit 130 is disposed and oriented towards the front of the cleaning robot 100. Furthermore, the cleaning robot 100 further has a camera selection unit 190 for selectively operating the cameras 121, 131 of the self-position recognition unit 120 and the obstacle detection unit 130, respectively, in accordance with the control data received from the controller 150.

Figure 4:
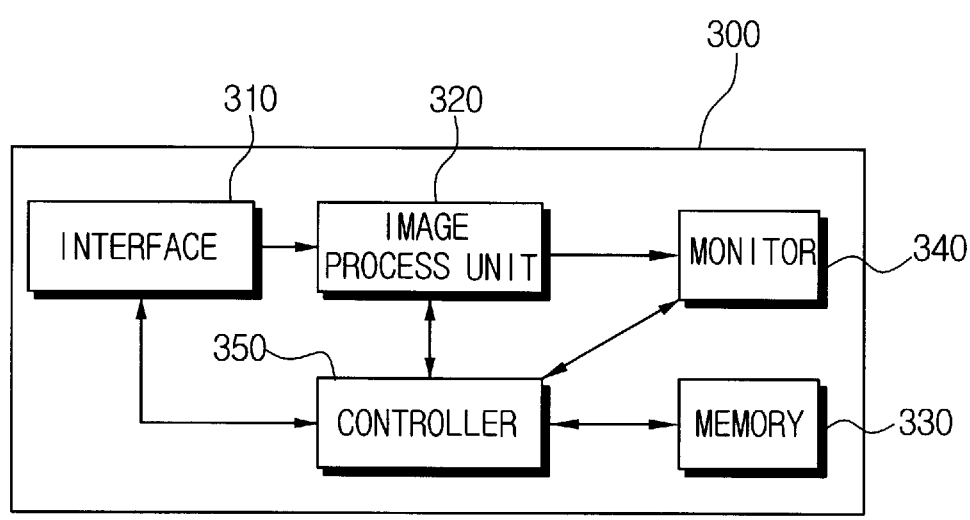
FIG. 4 is a schematic block diagram showing an image process server of FIG. 2.

FIG. 4 is a schematic block diagram of the image process server 300 according to the present invention.

Referring to FIG. 4, the image process server 300 has: an interface 310 for interfacing the data received from the mobile communication relaying apparatus 200 (FIG. 2); an image process unit 320 for encoding the image data transmitted through the interface 310; and a controller 350 for developing control data in accordance with the analyzed data of the image data encoded through the image process unit 320, and outputting the control data through the interface 310.

Here, the interface 310 of the image process server 300 can transmit the image data to the Internet through a mobile communication relay base from the mobile communication relaying apparatus 200 (FIG. 2), or transmitted by an RF signal directly from the mobile communication relaying apparatus 200.

Hereinbelow, an example of operation of the robot cleaning system using the mobile communication network according to the present invention will be described.

Referring again to FIGS. 2–4, when the driving signal is transmitted from a remote controller (not shown) or from the mobile communication terminal 400 through the mobile communication relaying apparatus 200, the controller 150 of the cleaning robot 100 performs an initializing step, and operates the first camera 121 of the self-position recognition unit 120 to obtain an image of the ceiling at the current position. Then, the controller 150 converts the image data, created through the operation of camera 121, into a mobile communication signal and transmits it to the mobile communication module 140, and outputs the mobile communication signal to the mobile communication relaying apparatus 200 (FIG. 2). After that, the mobile communication relaying apparatus 200, which receives the mobile communication signal from the mobile communication module 140 of the cleaning robot 100, relays the mobile communication signal again to the interface 310 (FIG. 4) of the image process server 300. When the image data is transmitted to the interface 310, the controller 350 of the image process server 300 allows the transmitted image data to be encoded in the image data process unit 320.

The cleaning robot 100 recognizes its current position referring to the encoded image data. When the current position of the cleaning robot 100 is recognized, the controller 350 of the image process server 300 creates the control data for controlling a desirable change in the position of the cleaning robot 100 from analysis of the image data, and outputs the control data to the interface 310. Then, the mobile communication relaying apparatus 200 (FIG. 2) relays the control data transmitted from the image process server 300 (FIG. 4) for controlling the change of the position of the cleaning robot 100 to the cleaning robot 100.

When the control data is transmitted to the cleaning robot 100, the mobile communication module of the cleaning robot 100 converts the transmitted mobile communication signal into control data, and transmits the control data to the controller 150 of the cleaning robot 100. The controller 150 of the cleaning robot 100 recognizes the desired position to move from the transmitted control data, outputs the control signal to the motor driving units 111a, 112a of the right and left wheels according to the recognized position, and drives the motors 111b, 112b. By doing so, the cleaning robot 100 changes its position.

At this time, the controller 150 of the cleaning robot 100 transmits the image data reflecting the planned path of intended travel, along which the cleaning robot 100 moves, through the mobile communication module 140 by operating the camera 131 to the image process server 300. Here, the controller 150 of the cleaning robot 100 controls the camera selection unit 190 for transmitting the image data created by periodically operating the camera 121 of the self-position recognition unit 120. In addition, the controller 150 of the cleaning robot 100 allows the image data photographed at the camera 121 of the self-position recognition unit 120 to be transmitted.

After the controller 350 of the image process server 300 receives the image data, through operation of the mobile communication relaying apparatus 200, from each of the cameras 121, 131 of the obstacle detection unit 130 and the self-position recognition unit 120, respectively, the image process server 300 analyzes the image data photographed at the camera 121 of the self-position recognition unit 120 and the image data photographed at the camera 131 of the obstacle detection unit 130, and outputs the control data related to change the position of the cleaning robot 100.

When the cleaning robot 100 moves to the desired place corresponding to the command, the controller 150 of the cleaning robot 100 outputs a movement completion signal that notifies the completion of the change of the position through the mobile communication module 140. The controller 350 of the image process server 300 that receives the data movement completion signal recognizes that the movement of the cleaning robot 100 is completed, creates the control data for ordering the cleaning operation, and outputs the control data to the interface 310.

Then, after the controller 150 of the cleaning robot 100 receives the control data for ordering the cleaning operation from the mobile communication relaying apparatus 200, the controller 150 drives the fan motor 115b by outputting the control data to the motor driving unit 115a of the vacuum cleaning unit 115 according to the control data for ordering the cleaning operation transmitted through the mobile communication module 140, and allows the cleaning robot 100 to start the cleaning operation from the current position. After that, the controller 150 of the cleaning robot 100 rotates and moves the robot body by outputting the control data to the driving unit 110 so that the cleaning operation can be performed along the programmed path. At this time, the camera 131 of the obstacle detection unit 130 consecutively photographs the front of the cleaning robot 100, and transmits the image data to the image process server 300. The cleaning robot 100 receives the control data from the image process server 300.

The robot cleaning system according to the present invention as described so far allows the image photographed at the cameras 121, 131 installed at the cleaning robot 100 to be processed at the image process sever 300, which is located at a long distance from the cleaning area. Moreover, the user can control the cleaning robot 100 from a long distance by using the mobile communication terminal 400.

Therefore, the robot cleaning system according to the present invention can improve the way of using the cleaning robot since the user can control the cleaning robot 100 from long distances by using the mobile communication network. Moreover, the cleaning robot can be manufactured as more compact, since the image process board does not have to be installed in the cleaning robot because the image is processed outside of the cleaning robot, and thus the production cost is also reduced. The preferred embodiment of the present invention has been illustrated and described herein. However, the present invention is not limited to the preferred embodiment described, and someone skilled in the art can modify the present invention without distorting the point of the present invention as set forth in the following claims.

What is claimed is:

1. A robot cleaning system using a mobile communication network, comprising:
   a cleaning robot for cleaning by moving freely in a cleaning area by a control data transmitted in a mobile communication signal;
   a mobile communication relaying apparatus for receiving the mobile communication signal transmitted from the cleaning robot and another mobile communication signal to control the cleaning robot, and relaying the mobile communication signals to a corresponding remote apparatus; and
   a mobile communication terminal for transmitting command signals for performing operations to the cleaning robot through the mobile communication relaying apparatus.

2. The robot cleaning system of claim 1, wherein the cleaning robot comprises:

a driving unit for moving a robot body;

a self-position recognition unit having a camera and a sensor for recognizing a current position of the robot body;

an obstacle detection unit having a camera and a sensor for detecting an obstacle adjacent the robot body;

a vacuum cleaning unit for collecting dust on a floor;

a mobile communication module for transmitting the mobile communication signal using the mobile communication relaying apparatus; and a controller for controlling each of the units to move and clean the cleaning area corresponding to the control data transmitted from the mobile communication module.

3. The robot cleaning system of claim 2, wherein the controller transmits the operation completion data to the mobile communication terminal when an operation is completed in accordance with the transmitted control data.

4. The robot cleaning system of claim 2, wherein the robot controller transmits an image photographed through the camera of the self-position recognition unit and the camera of the obstacle detection unit to the mobile communication relaying apparatus.

5. The robot cleaning system of claim 4 further comprising an image process server for analyzing the image data transmitted through the mobile communication relaying apparatus, and for transmitting the control data according to the analyzed result to the cleaning robot through the mobile communication relaying apparatus.

6. The robot cleaning system of claim 5, wherein the image process server comprises:

an interface for interfacing a data with the mobile communication relaying apparatus;

an image process unit for processing the image data transmitted through the interface; and a controller for analyzing the image data processed at the image process unit, for creating the control data according to the analyzed result, and for outputting the control data to the interface.

* * * * *